US00RE34767E

United States Patent [19]

Soong

[11] E Patent Number: Re. 34,767

[45] Reissued Date of Patent: Oct. 25, 1994

[54] HANDLE DEVICE FOR SPORTS EQUIPMENT SHAFTS

[76] Inventor: Tsai C. Soong, 1839 Jackson Rd., Penfield, N.Y. 14625

[21] Appl. No.: 67,941

[22] Filed: May 27, 1993

Related U.S. Patent Documents

Reissue of:

[64] Patent No.: 5,160,139
Issued: Nov. 3, 1992
Appl. No.: 775,450
Filed: Oct. 15, 1991

[51] Int. Cl.[5] ..... A63B 53/14

[52] U.S. Cl. ..... 273/81 R; 273/165; 273/75

[58] Field of Search ..... 273/81 R, 81.2, 81.3, 273/81.4, 81.5, 81.6, 73 J, 75, 72 R, 72 A, 26 B, 67 R, 67 DA, 193 R, 194 R, 186.1, 186.2, 187.4, 77 R, 165

[56] References Cited

U.S. PATENT DOCUMENTS

| | | | |
|---|---|---|---|
| 1,139,843 | 5/1915 | Brown | 273/81.6 |
| 1,942,922 | 1/1934 | Gerow | 273/165 |
| 2,133,695 | 10/1938 | Hall | 273/81 R |
| 3,638,943 | 2/1972 | Snauwaert | 273/73 J |
| 3,674,267 | 7/1972 | Hollis | 273/73 JX |
| 4,053,676 | 10/1977 | Kaminstein | 273/75 |
| 4,082,276 | 4/1978 | Szafinaski | 273/75 |
| 4,252,319 | 2/1981 | Lorang | 273/186 A |
| 4,660,832 | 4/1987 | Shomo | 273/73 J |
| 4,736,949 | 4/1988 | Muroi | 273/73 J |
| 4,979,743 | 12/1990 | Sears | 273/81 R |

FOREIGN PATENT DOCUMENTS

| | | | |
|---|---|---|---|
| 1959368 | 11/1970 | Fed. Rep. of Germany | 273/73 J |
| 2106800 | 9/1971 | Fed. Rep. of Germany | 273/73 J |
| 3428528 | 2/1986 | Fed. Rep. of Germany | 273/73 J |
| 0123235 | 10/1978 | Japan | 273/73 J |
| 469923 | 8/1937 | United Kingdom | 273/81.5 |
| 2230458 | 10/1990 | United Kingdom | 273/73 J |

*Primary Examiner*—Sebastiano Passaniti
*Attorney, Agent, or Firm*—Bernard A. Chiama

[57] ABSTRACT

A sports equipment having a shaft connected between a handle for gripping by a user during play and a working end such as head against which a ball may be impacted wherein the handle is formed with a rigid sleeve member adapted to encircle one end of the shaft and an elastic media element positioned between the sleeve member and the applied end of the shaft. Gripping and swinging of the sports equipment by the user when grasping the handle effects longitudinal rocking movement of the sleeve member relative to the applied end of the shaft and thereby provide integrated force of the fingers of the user of the equipment upon the working end thereof.

5 Claims, 2 Drawing Sheets

HANDLE DEVICE FOR SPORTS EQUIPMENT SHAFTS

Matter enclosed in heavy brackets [ ] appears in the original patent but forms no part of this reissue specification; matter printed in italics indicates the additions made by reissue.

*This application is a reissue application of U.S. Pat. No.* 5,160,139, issued Nov. 3, 1992 from application Ser. No. 07/775,450, filed Oct 15, 1991.

BACKGROUND OF THE INVENTION

The handle of a sports equipment, in most cases, is designed to provide a firm grip by the hand or hands to hold the equipment without slipping and to apply force to manipulate the equipment for desired performance. In some cases, such as the tennis racket, we demand an immediate and forceful response as soon as the hand force is applied. A pin-point accuracy on which the ball will be going is desirable but is not really expected. In such cases, a rigid connection between the handle and the rest of the equipment is usually desirable. The rigid connection of the handle to the rest of the equipment assures a quick response whenever the hand force is applied. However, for some sports equipment, such as putters of golf club, an immediate and forceful response is as not as important to the performance of the equipment as a controlled and a measured response which follows the application of the hand force. For the putter, the distance expected of the ball is not large, but the ball is expected to land as close to the desired spot as possible. Experience tells the golfer how he is to hold the putter and how much force he is to deliver through the handle of the club in order to land the ball at the desired spot. However, the force applied to the handle by a human hand, especially with two hands together, is not as exact science. Nurves and muscles of a human body are subjected to many physical-fluencing factors not controlled by the player. That is why a golfer, even pros, will always have "good" days and "bad" days. The invention is to improve the equipment so that the the invention is to improve the equipment so that the performance of the equipment will rely less on human factors.

We shall discuss the invention through its application to a gold club. But it is understood that it applies to other sports equipment as well if applicable.

The invention recognizes the fact that it is very difficult to maintain consistency each time when a human hand holds the handle of a gold club, its five fingers grip the handle tightly and each finger exerts its force. The combined force from that hand is the sum of the forces from each individual fingers. Each finger may have a slightly different location on the handle than the previous play and each finger may exert a slightly different magnitude of force than the previous play. Therefore, the resultant force and moment applied to the handle from both hands may be slightly different from play to play. A good player achieves a better consistency than a less experienced player. The problem here is that all the ten fingers are allowed to handle the club individually. Suppose all the five fingers of each hand and for that matter, all of the two hands, are not to grip the rigid shaft directly. Suppose the two hands are covering the shaft through an outer sleeve which can hold its shape without deformation under the gripping force, and the sleeve contacts the handle portion of the club shaft through an elastic media, such as rubber. In this way, an individual finger can not directly drive the club shaft. The combined force from all the ten fingers, drives the club shaft. The response is now decided by a relative turning movement between the rigid sleeve and the shaft. One misplaced finger, or an "abnormally" large grip force by a finger, does not change things, if the combined moment, exerted by the both hands, remains the same. This is the essence of the invention.

BRIEF DESCRIPTION OF THE DRAWINGS

Figures only depict some of the preferred embodiments of the invention among all practically possible and desirable arrangements.

DESCRIPTION OF THE PREFERERD EMBODIMENTS

Figure 1:
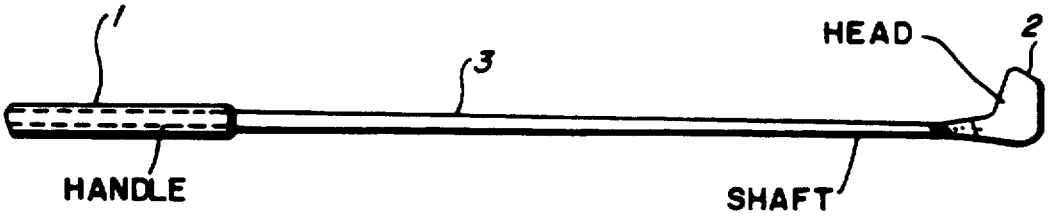
FIG. 1 shows a conventional golf club.
Figure 2:
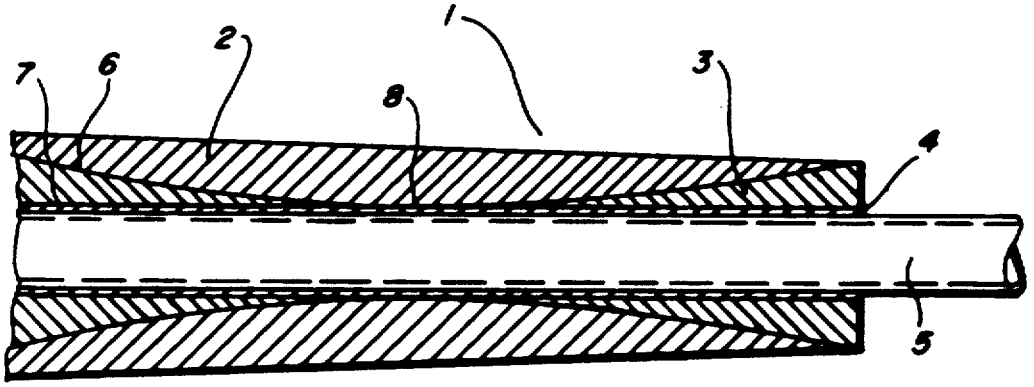
FIG. 2 shows a sleeve unit installed on a shaft.

FIG. 1 shows a golf club. FIG. 2 shows a sleeve unit 1 installed on the shaft of a golf club. The sleeve unit 1 comprises a sleeve member 2 on which an optional grip made of rubber or leather is not shown for clarity, a media element 3 and an optional cylindrical member or inner tube 4. The sleeve unit is installed over the grip portion of the conventional shaft of the golf club 5. The sleeve member 2 is made of a material, such as graphite fiber, or plastic, hard enough to maintain a rigid shape upon the gripping force of the hands. There may be an optional layer of grip material, such as rubber or leather to cover the outer surface of the holder so that the hands will not slip. The media element is made of resilient, elastic and preferable moldable material, such as rubber, which fills partially or completely the space between the inner surface of the sleeve member 2 and the outer surface of the club shaft 5. There may be an optional thin tube 4, made of durable material, such as plastics, between the media element 3 and the shaft 5. This is to facilitate installation of the sleeve unit 1 over the shaft 5. This may be omitted if the inner surface of the media element 3 has no difficulty in sliding over the outer surface of the shaft 5; or that unit 1 is molded over the shaft 5 with media the media element 3 molded during manufacturing of the golf club shaft.

The inner surface 6 of the sleeve element may be a radially curved surface as shown in FIG. 2, of arbitrary curvature; or it may be a straight line surface, or a combination of straight lines and arc. There may be a minimum surface contact between sleeve member 2 and element 3, as a pivot, with no media 3 in between, but the contact is not rigid, fused-together-like in nature, and the length of contact is kept at minimum as possible, or none at all. By manipulating the shapes and volumes of the media, different compliances of the shaft to the handle can be achieved.

The inner surface 6 of the sleeve element may be a radially curved surface as shown in FIG. 2, of arbitrary curvature; or it may be a straight line surface, or a combination of straight lines and arc. There may be a minimum surface contact between sleeve member 2 and element 3, as a pivot, with no media 3 in between, but the contact is not rigid, fused-together-like in nature, and the length of contact is kept as minimum as possible, or none at all. By manipulating the shapes and volumes of the media, different compliances of the shaft to the handle can be achieved.

The sleeve member 2 and element 3 in FIG. 2 may be hollowed and the media material of 3 may be different at different places, or have multiple layers as concentric tubes so that the elastic stiffness of the material may be affected to change the moment applied to the shaft handle.

Figure 3:
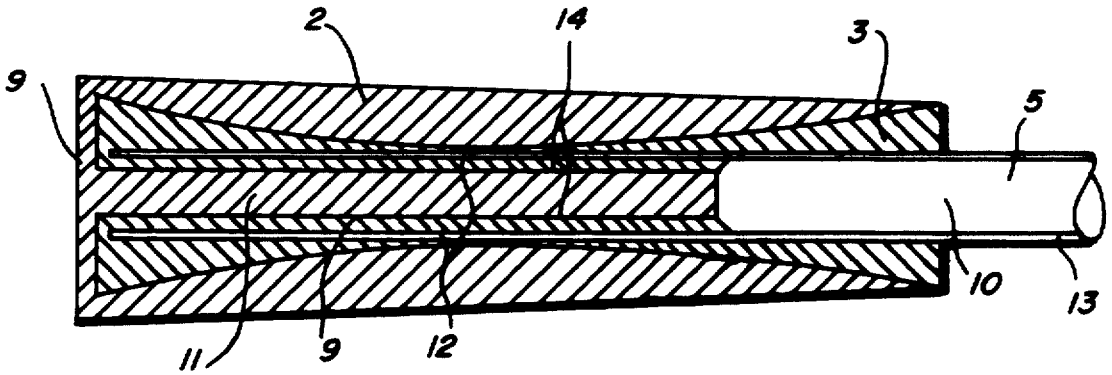
FIG. 3 shows a sleeve unit with an extended part inside the shaft.

Since the diameter of the golf club is small, but there is empty space inside the shaft 5 which may be utilized, media volume may be increased by using the empty space inside. FIG. 3 shows the holder sleeve member 2 is extended to the end 7 and extends into the interior hollow space of the shaft tube 5 in the form of a rod 8 which may be hollow of solid, with some suitable length inside the shaft. Then the media element 3 may extend into the space 9, between the inner wall of the shaft 5 and the outer surface of 8. The embodiment of FIG. 3 will produce larger bending moment upon the golf shaft than that of FIG. 2. In FIG. 3, there is no solid, hard contact between the sleeve unit components 2 and 3 and the shaft tube 5 at any place thereon.

The sleeve unit as shown in FIG. 2 may be made as a detachable assembly unit which consists of components 2, 3 and optionally the optional tube 4. This unit may slip over, with or without glue, on an existing golf club shaft with its rubber grip stripped.

Figure 4:
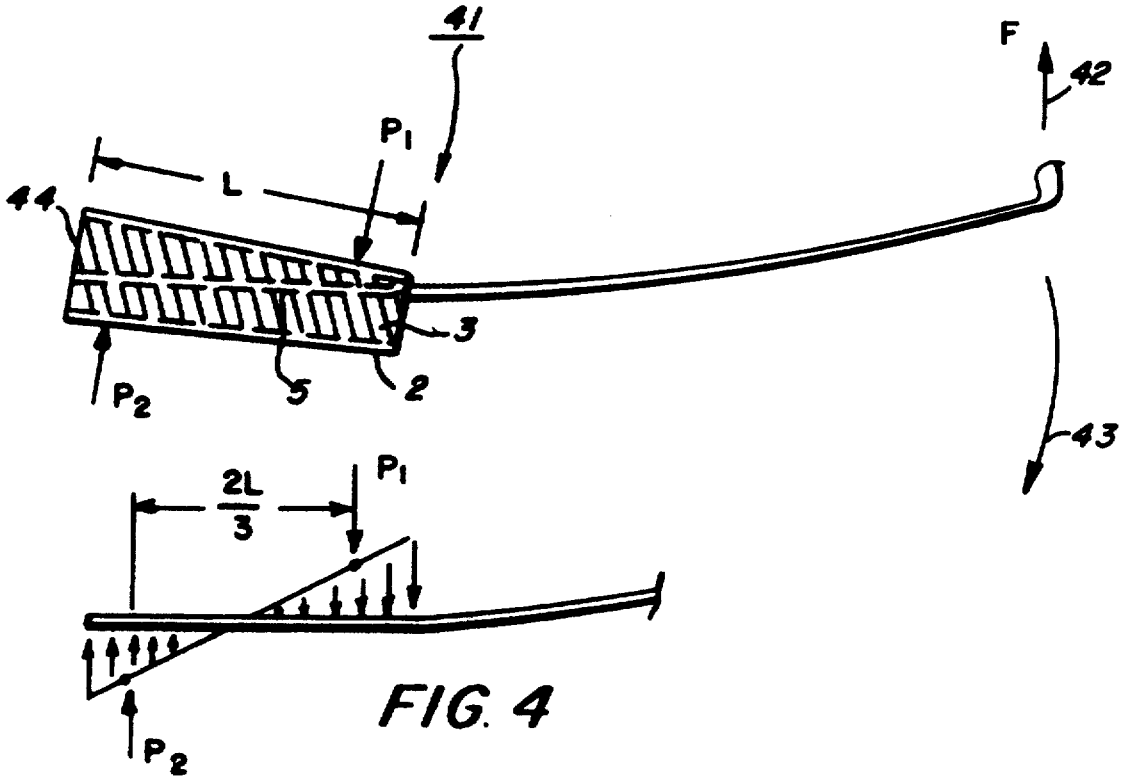
FIG. 4 shows forces of a tilted holder on the shaft.

Some detailed description regarding the operation of the sleeve unit may be helpful to understand more of the invention and its merit. It will be assumed the sleeve member 2 is rigid and the portion of the handle that is inside the sleeve member 2 as rigid also as shown in FIG. 4. The latter is true when it is considered that the bending of a golf shaft comes mainly from the portion that extends out from the handle down to the end of the shaft where the heavy head is attached. This portion is tapered and its diameter is reduced quickly to enhance the flexibility of the golf club. FIG. 4 shows a golf club 41 with a sleeve unit. The size of the sleeve unit is exaggerated in its proportion to the rest for clarity. An inertia force 42, of magnitude F, is produced when the head is swung in the direction 43. The force distribution from the media element surrounding the shaft depends on the volume and shape of the media element in between. Media material farther from the pivot point will exert more force. For the sleeve member shown in FIG. 4, a linear distributed force as shown is approximately true. In driving the golf ball, one hand exerts a resultant force $P_1$ and the other a smaller but opposite resultant force $P_2$ with the correct moment arm 2L/3 would be sufficient to deliver the required torque and force. How the fingers and the palms of a user are combined to put up the desired distributed forces upon the outer surface of the holder is not important as long as the resultants are right. It is easier to deliver the required drive to the golf club in a consistent manner by a golf club with the present invention than the prior art using two bare hands, holding the shaft directly.

If the sleeve member 2 has a rigid connection with the shaft anywhere along the axial length of the handle part, either at the butt end, at the middle, or at the end opposite to the butt end, then the holder behaves mechanically as a structural integral part of the shaft. Hence an error made by an individual finger will be transmitted directly to influence the accuracy of the drive. It is clear that the prior art or even a rigid sleeve member with some mechanical connection with the shaft would be inferior in steadiness and consistency of performance as compared to the arrangement studied in the application.

It is imperative in this application to distinguish the physical characteristics of the media element suitable for a successful application to this invention. If the media element is too stiff, that is, if it only depresses a small amount for an applied load suitable in driving the golf club, then when the sleeve member is forced to tilt to drive the shaft, the response of the shaft will not be too different than the prior art shaft. If the media element is too soft, it may not be able to deliver the required torque. There are designs in tennis racket handle using structural foams or damping material to fill some space between a stiff core and some exterior holding means. These medium materials are not structurally unyielding as the core. However, such design has never inspired inventive thoughts to improved measured control and consistent compliance as that advocated by the present application. In said design, its outer player, plus the media element material, is always intended to provide ea sufficiently stiff cylinder which embraces the core and moves with the core in unison, as sure and as quick as possible. It discourages elastic delay from handle to the core due to material compliance, because in tennis or in similar racket games, power and quick response are supreme. The media element and the design intent are for dampening reduction only. It filters the shock after the vibration goes through. The present application demands controlled elastic compliance between the sleeve member and the shaft. The compression of the media element creates the required torque to drive the shaft in a controlled manner. If the compression is too small, the measured control is lost. This is a fundamental understanding of the present invention. It would not be practical to categorically define such an optimum compliance or to specify the media's physical characteristics that possesses this property. The uniqueness of the present invention and its difference from racket handles which also have medium material employed in the handle is clear.

Figure 5:
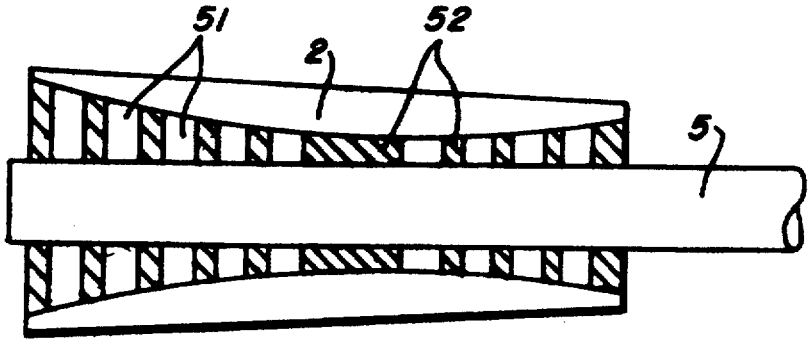
FIG. 5 shows an embodiment of the media inside the holder.

For some material which is incompressible, such as rubber, there should be some free space left at the exposed ends, such as 44 in FIG. 4, to allow the material to move in order to produce displacement. Some material has excellent shear rigidity, such as some orthotropic plastic foam material, the connection between the sleeve member 2 and the shaft may be designed as spaced apart annular rings, such as shown in FIG. 5. In FIG. 5, 52 are spacings between rings 52, and the tilting of the sleeve member will force the bending of the shaft through both shear and compression of the media between them. Since putters should produce a drive force on the ball with as minimum "shock" to the ball as possible, the cushioning effect of the media element with no rigid connection between the holder and the shaft would be a very valuable advantage, and perhaps a deciding one, in driving a ball straight to the hole.

Some minor revisions in geometry and design are permitted which is within the realm of the invention as long as the principle of why the inventive holder adds to the consistency of the putter's performance is achieved.

What is claimed is:

1. A sports equipment including a shaft having a longitudinal handle portion at one end for manipulation by a user during playing use of the equipment, the handle portion comprising a sleeve unit arranged around an outer surface of said end of the shaft and adapted for manual gripping by the user of the equipment, said unit including a sleeve member arranged to encircle the outer surface of said shaft end and an elastic media element arranged between said sleeve member and said outer surface of said end, said sleeve member having an inner surface adjacent to and extending along said elastic media element and being spaced from said outer surface of said shaft end and out of contact therewith, said elastic media element being positioned whereby the manipulation of the handle portion during use of the sports equipment produces relative longitudinal rocking movement between said sleeve member and said one end of the shaft, said inner surface of said sleeve member facing said media element and being shaped such that it convex towards the media element and convex [at the longitudinal center of the sleeve member] *along the longitudinal axis of said sleeve member between opposite ends of said sleeve member.*

2. The sports equipment of claim 1 including a cylindrical member between said media element and the outer surface of the shaft of the sports equipment.

3. The sports equipment of claim 1 wherein the sports equipment is a golf club.

4. The sports equipment of claim 1 wherein said sleeve unit is detachable from the shaft of the sports equipment.

5. A sports equipment including a shaft having a longitudinal handle portion at one end for manipulation by a user during playing use of the equipment, the handle portion comprising a sleeve unit arranged around an outer surface of said end of the shaft and adapted for manual gripping by the user of the equipment, said unit including a sleeve member arranged to encircle the outer surface of said shaft end an elastic media element arranged between said sleeve member and said outer surface of said end, said member having an inner surface adjacent to and extending along said elastic media element and being spaced from said outer surface of said shaft end and out of contact therewith, said elastic media element being positioned whereby the manipulation of the handle portion during use of the sports equipment produces relative longitudinal rocking movement between said sleeve member and said one end of the shaft, said shaft being at least partially hollow and said sleeve member and said media element extending into the hollow space inside the shaft.

* * * * *